C. S. LOCKWOOD.
ROLLER BEARING WITH LOOSE GUARD RING.
APPLICATION FILED JUNE 2, 1910.

982,512.

Patented Jan. 24, 1911.

Witnesses
L. Lee
J. Walter Greenbaum

Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH LOOSE GUARD-RING.

982,512. Specification of Letters Patent. Patented Jan. 24, 1911.

Application filed June 2, 1910. Serial No. 564,541.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Loose Guard-Rings, fully described and represented in the following specification and the accompanying drawings, forming a part of the same.

This invention relates to a roller bearing having tapering rolls fitted to a conical hub and embraced by a conical casing, so that the rolls may efficiently sustain end thrust; and the object of the invention is to prevent the rolls from sliding in either direction upon the hub when subjected to end thrust.

With tapering rolls, which are necessary to produce a true rolling friction upon a conical hub, the space between the hub and the casing is also of tapering character, and end thrust operates to crowd the rolls upwardly upon the hub into the larger part of the casing; and the invention prevents such end movement of the rolls, by forming corners upon the outer ends of the rolls and fitting a guard-ring thereto. Any motion of the rolls in the opposite direction is prevented by an annular shoulder upon the smaller end of the hub with which the inner corners of the rolls contact. The rolls are thus held in a fixed relation to the hub, and therefore operate in a fixed relation to the casing regardless of end strains to which the bearing may be subjected.

The construction not only regulates the movement of the rolls when the bearing is in operation, but it operates most effectively to hold the set of rolls upon the hub independently of the casing, thus permitting the handling of these parts as a unitary structure before the casing is applied.

The construction not only facilitates the manufacture of the bearing, but also avoids the loss of the rolls whenever the casing is removed from the set of rolls upon the hub, after the bearing has been in use.

In the present invention, plain tapering rolls are used without any grooves, necks, or collars thereon, thus making the cheapest construction for both the rolls and the seats upon the hub and casing, while connecting the rolls and hub. Other means have been devised to effect this latter object, but the present means serve also to guide and restrain the movement of the rolls when the bearing is in operation.

The invention will be understood by reference to the annexed drawing, in which—

Figure 1:
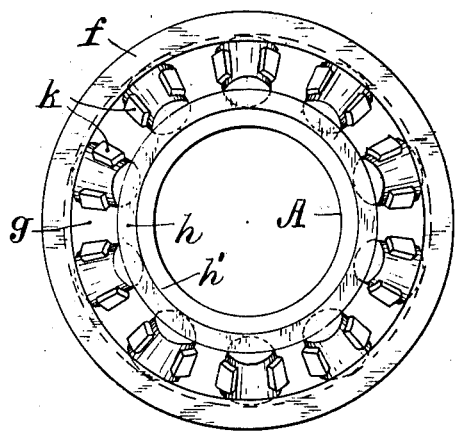
Figure 2:
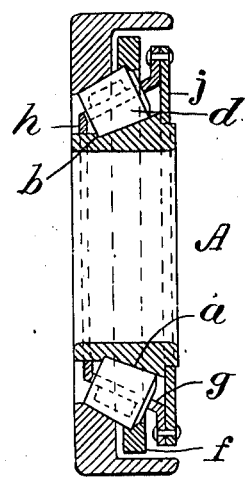
Figure 3:
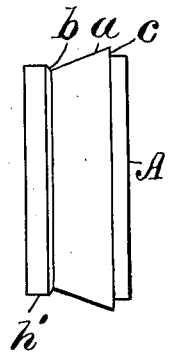
Figure 4:
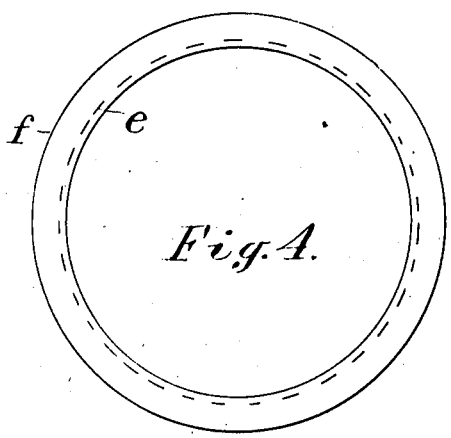
Figure 5:
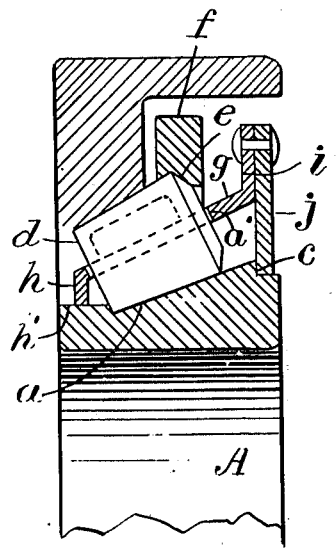
Figure 6:
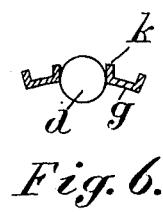

Figure 1 is an end view of a bearing with the casing removed to show the guard-ring in its relation to the rolls; Fig. 2 is a longitudinal section, where hatched, of the complete bearing; Fig. 3 is an elevation of the hub, and Fig. 4 is an end view or elevation of the guard-ring viewed from its larger side; Fig. 5 is a section like the upper half of Fig. 2 upon a greatly enlarged scale, to show the section of the guard-ring more clearly; Fig. 6 is a transverse section of the cage adjacent to one of the rolls showing the lugs in a radial position before they are bent against the rolls; and Fig. 7 shows the cage, the guard-ring, and one side of the hub in section with a roll partially applied to the hub.

The hub A has a conical seat $a$ with an inwardly-facing shoulder $b$ at the smaller end of the hub, and an outwardly-facing shoulder $c$ at the larger end of the hub. Tapering rolls $d$ are fitted to the hub and formed with corners at both ends, those at the smaller end contacting with the shoulder $b$, and those at the larger end fitting a groove $e$ upon the inner periphery of the guard-ring $f$. The rolls are shown beveled at their larger corners to form a less acute angle, and such obtuse angle is fitted to the groove in the guard-ring. The opposite walls of the groove in the guard-ring fit the periphery and larger end of the roll at its corner, and the ring is thus held securely from displacement.

A cage having a conical shell $g$ and a flange $h$ to ride upon the smaller end $h'$ of the hub is shown fitted to the rolls, and the shell formed with openings $a'$ to insert the rolls into contact with the hub. The larger end of the shell has a ring $i$, and a flange $j$ is shown riveted thereto, to contact with the outwardly facing shoulder $c$ upon the hub. The shell is designed partly to hold the series of rolls upon the hub when handled apart from the casing and requires a peculiar construction to effect this object and to permit the application of the rolls to the hub. Lugs $k$ are formed upon the shell adjacent to the openings $a'$ and are projected outwardly when first made to permit the insertion of the rolls, but are afterward bent inwardly as shown in Fig. 1, thus serving to retain the rolls in contact with the hub, and permit the handling of the hub and series of rolls as a unit before they are placed in the casing.

Figure 7:
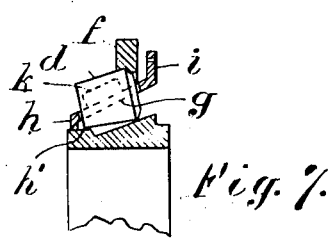

The manner of applying the rolls to the hub and guard-ring simultaneously is shown in Fig. 7, the rolls being inserted into the openings $a'$ of the cage with their outer corners in contact with the groove in the guard-ring, and their outer corners resting upon the seat $h'$ on the hub. When the rolls are thus inserted, the rolls with the cage are pushed upwardly upon the hub, thus bringing their smaller ends into contact with the shoulder $b$. The lugs $k$ are then bent, as shown in Fig. 1, into loose contact with the sides of the rolls, which holds the rolls from displacement while permitting them to turn freely in the openings $a'$. The guard-ring becomes engaged with the rolls during this operation so that it is retained in place thereby.

A continuous ring like the guard-ring $f$ is subjected to mere tension when the bearing is in operation, and is thus able to resist strain most effectively, and as it is rotated exclusively by the natural movement of the rolls, it does not oppose any material resistance to such motion, even when under a considerable strain.

The parts are so proportioned that the contact of the guard-ring with the larger corners of the rolls, keeps the smaller corners adjacent to the shoulder $b$ upon the hub, thus keeping the rolls in a fixed relation to the hub, which insures their operating in a fixed relation to the casing.

I am aware that a guard-ring is not new, and do not therefore claim a guard-ring broadly, but the combination of a guard-ring having a single groove with plain conical rolls having corners at opposite ends and a tapering hub having a shoulder at its smaller end to contact with the corner upon the smaller ends of the rolls.

Having thus set forth the nature of the invention what is claimed herein is:

1. In a roller bearing, the combination, with a conical hub having an inwardly facing shoulder at its smaller end and an outwardly facing shoulder at its larger end, of a series of tapering rolls fitted to the hub with their smaller ends against the inwardly facing shoulder and having a corner upon their larger ends, a guard-ring having an internal groove fitted to the said corners, and a cage having openings fitted to the rolls and having means to retain them upon the hub, and a separate flange secured to the cage in contact with the outwardly facing shoulder.

2. In a roller bearing, the combination, with a conical hub having an inwardly facing shoulder at its smaller end and an outwardly facing shoulder at its larger end, of a series of tapering rolls fitted to the hub with their smaller ends against the inwardly facing shoulder, a cage having openings fitted to the rolls and having means to retain them upon the hub, and a separate flange secured to the cage in contact with the outwardly facing shoulder, as and for the purpose set forth.

In testimony whereof I have hereunto set my hand in the presence of two subscribing witnesses.

CHARLES S. LOCKWOOD.

Witnesses:
 WILLIAM D. BROWN,
 IVY W. ASLIN.